United States Patent [19]

Glumac

[11] Patent Number: 4,537,378
[45] Date of Patent: Aug. 27, 1985

[54] MOBILE STORAGE PLATFORM AND LIFTABLE BED TRAILER

[76] Inventor: Nick P. Glumac, P.O. Box 327, Kingsbury, Ind. 46345

[21] Appl. No.: 639,188

[22] Filed: Aug. 9, 1984

Related U.S. Application Data

[63] Continuation of Ser. No. 393,067, Jun. 28, 1982, abandoned, which is a continuation-in-part of Ser. No. 187,349, Sep. 15, 1980, Pat. No. 4,372,514.

[51] Int. Cl.³ .............................................. F16M 11/32
[52] U.S. Cl. .................................. 248/163.1; 108/53.3; 414/498
[58] Field of Search .............. 248/163.1, 163.2, 165, 248/160; 206/505, 506, 507; 414/498, 495; 108/91, 53.3, 145; 280/425 A, 425 R

[56] References Cited

U.S. PATENT DOCUMENTS

| | | | |
|---|---|---|---|
| 2,412,158 | 12/1946 | Kliehlman et al. | 108/145 |
| 2,485,406 | 10/1949 | Paine | 248/259 |
| 2,953,410 | 9/1960 | Chaney | 280/425 R |
| 3,148,794 | 9/1964 | Sauer | 414/498 |
| 3,586,189 | 6/1971 | Tornheim | 414/498 |
| 3,700,070 | 10/1972 | King | 108/145 |
| 3,719,299 | 3/1973 | Oehler | 414/498 |
| 3,802,006 | 4/1974 | Nelson et al. | 414/495 |
| 4,010,826 | 3/1977 | Jones | 414/495 |
| 4,050,707 | 9/1977 | Glumac | 414/498 |
| 4,053,072 | 10/1977 | Ross et al. | 414/498 |
| 4,304,518 | 12/1981 | Carder et al. | |
| 4,313,708 | 2/1982 | Tiliakos | 414/498 |
| 4,372,514 | 2/1983 | Glumac | 248/163.1 |
| 4,474,359 | 10/1984 | Weaver | 414/498 |

Primary Examiner—Ramon S. Britts
Assistant Examiner—Ramon O. Ramirez

[57] ABSTRACT

Vehicle transport means having a liftable bed and a fixed bed, the liftable bed being supported and raised upon rotary arms and a mobile storage platform having pairs of legs which downwardly converge toward each other in a manner to permit the legs of the platform to nest and wherein means are provided to prevent jamming of the nesting pairs of legs both in the longitudinal and in the lateral direction.

5 Claims, 16 Drawing Figures

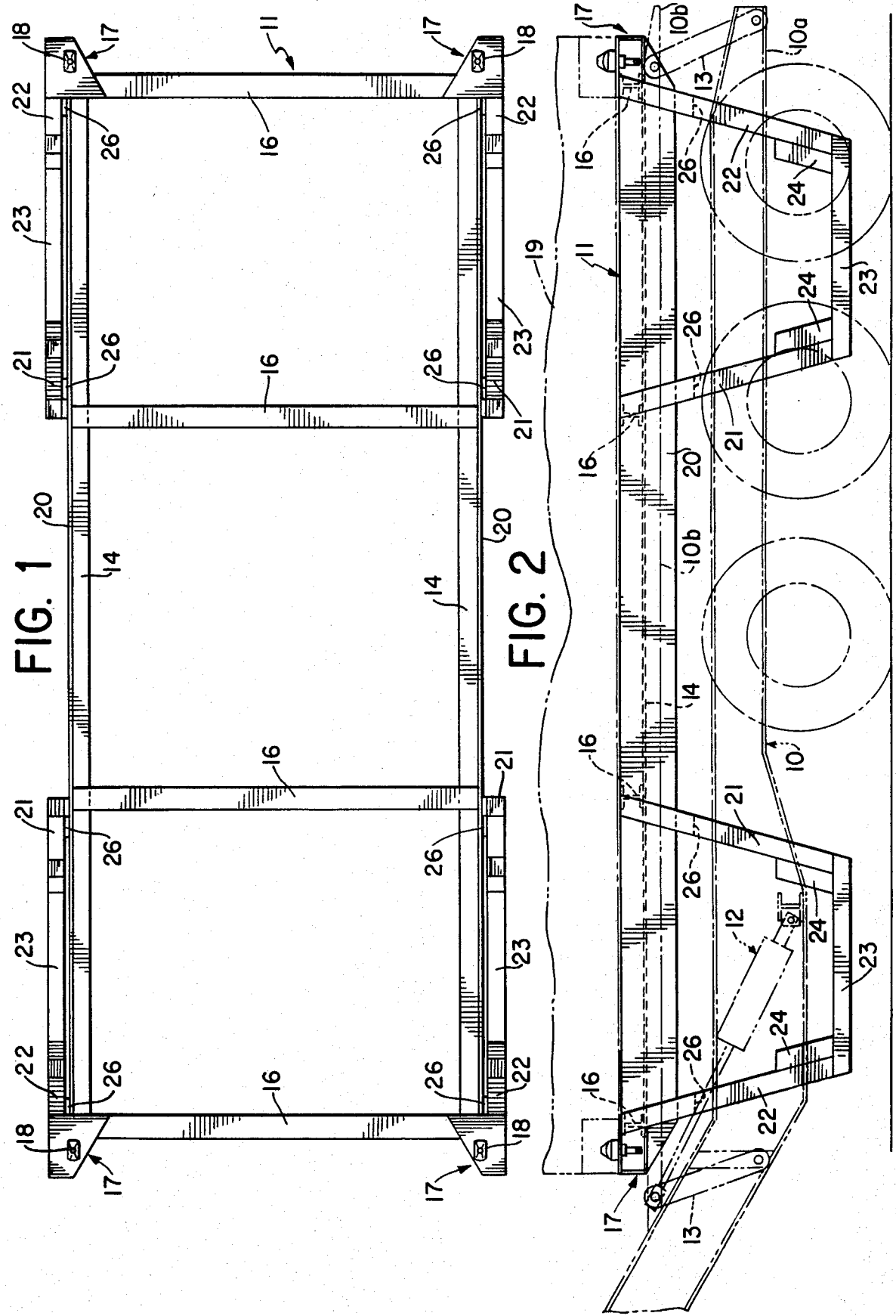

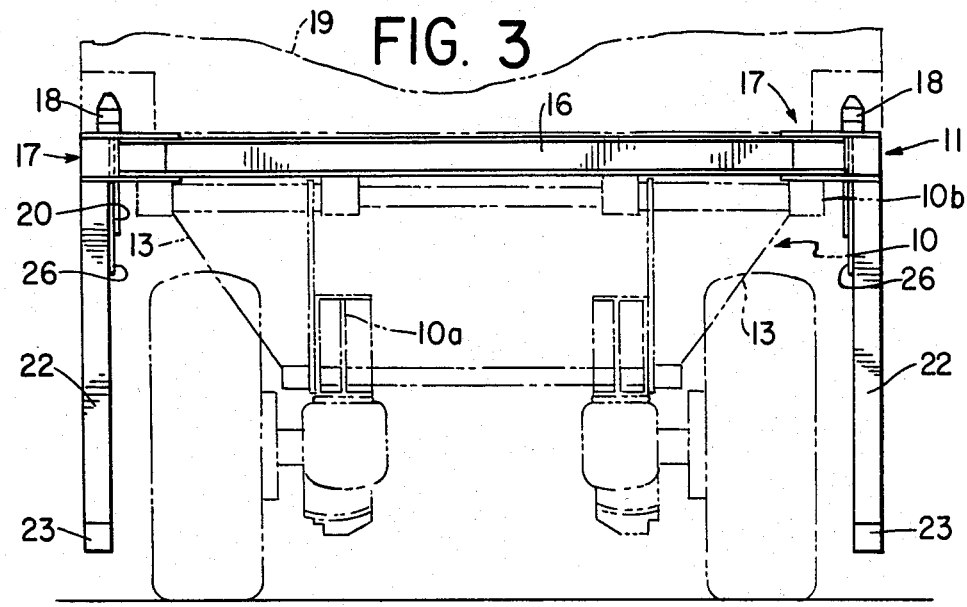
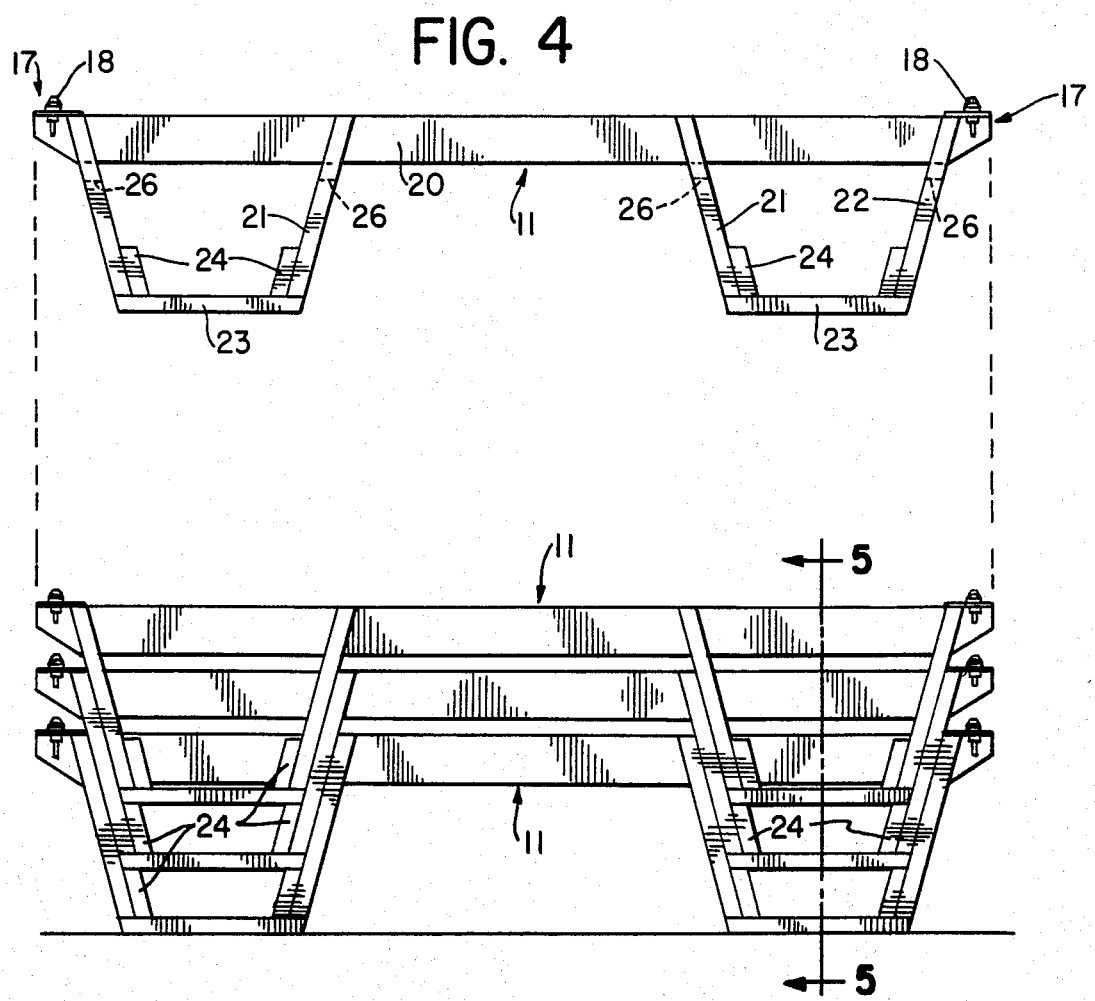

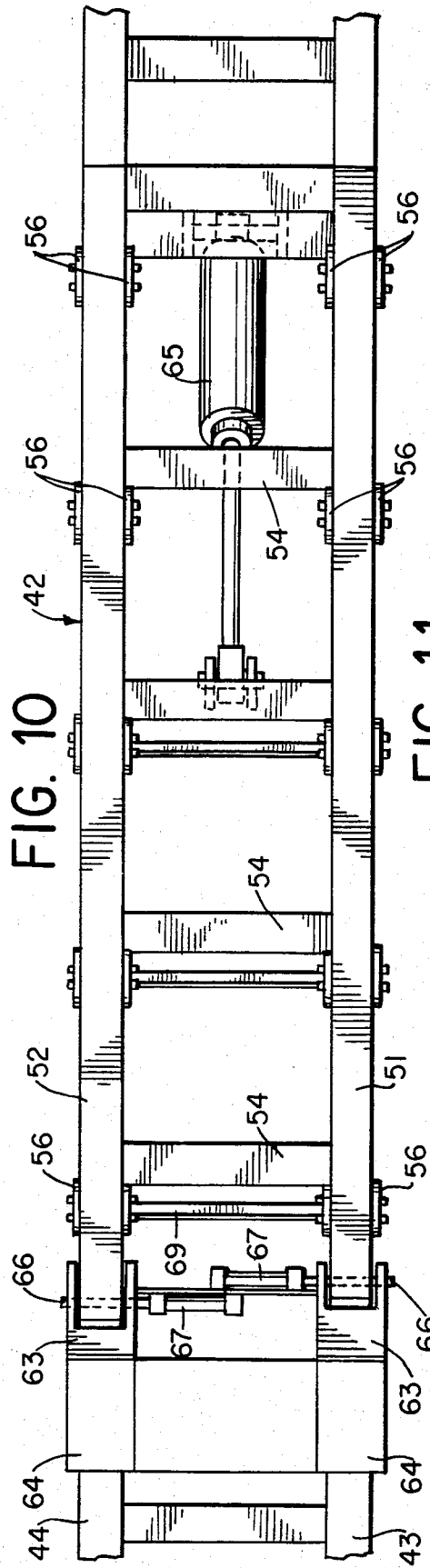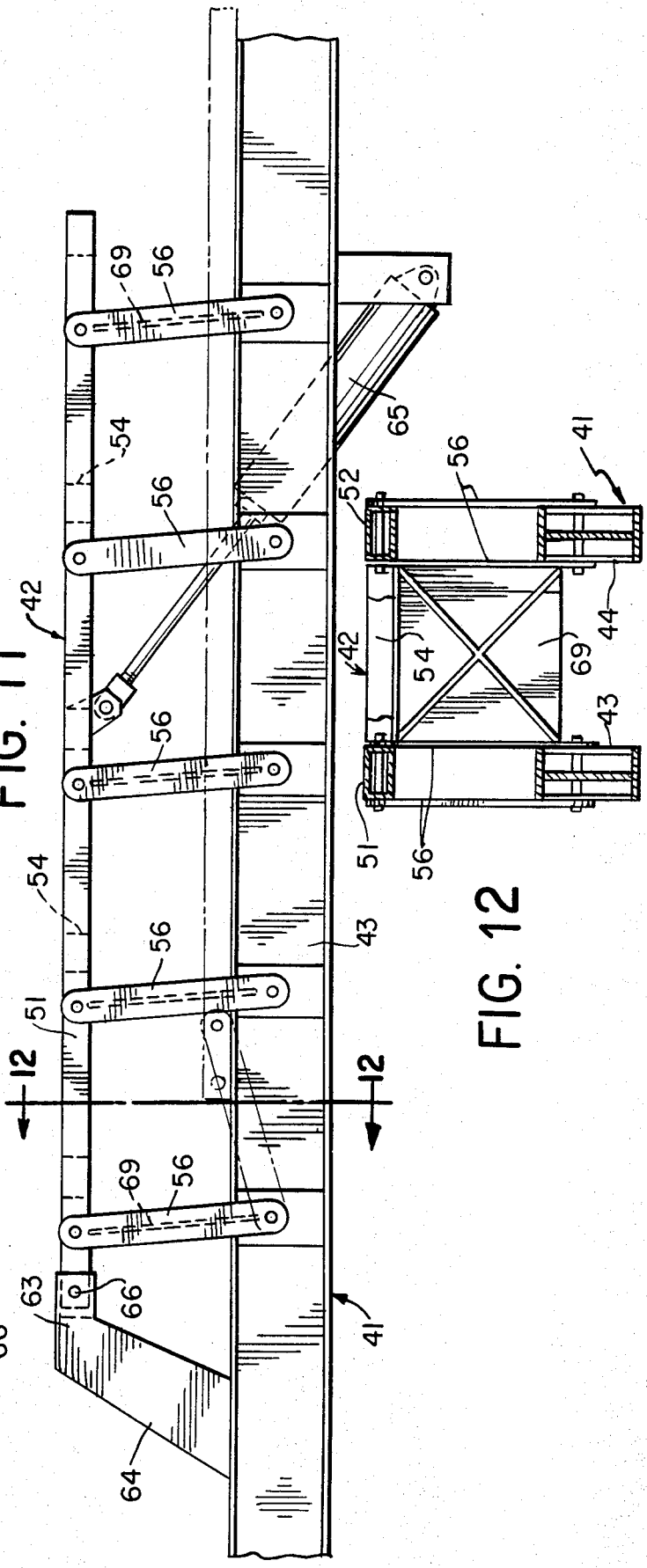

MOBILE STORAGE PLATFORM AND LIFTABLE BED TRAILER

BACKGROUND OF THE INVENTION

This is a continuation of application Ser. No. 393,067, filed June 28, 1982, now abandoned, which application is a continuation-in-part of copending application Ser. No. 187,349 filed Sept. 15, 1980, now U.S. Pat. No. 4,372,514.

The present invention is an improvement in the construction and design of mobile storage platforms of the type used in conjunction with liftable bed truck trailers or in conjunction with liftable bed cargo transport means and is an improvement in the construction and design of liftable bed trailers or vehicle transport means. Liftable bed trailers generally speaking employ a fixed bed and a liftable bed superimposed thereon in the loading mode which can be maneuvered under a mobile storage platform. Thereafter, the liftable bed is raised causing the legs of the storage platform to be lifted from the ground to a sufficient height to pass over normal road variances.

A basic purpose for the utilization of mobile storage platforms and liftable bed cargo transport means is to permit the preloading of the storage platforms and the transport of cargo on the storage platform as separate and distinct steps. In other words, steel cargo may be successively loaded upon storage platforms in a depot and in fact kept in storage for some time prior to the transporting of the loaded storage platforms to another location. This is a great saving in time and money since the storage platforms are inexpensive as capital investment in comparison with truck trailers which might otherwise be initially loaded with cargo. Furthermore, loading of cargo upon many storage platforms as a distinct initial step greatly saves in the utilizaton of manpower.

Since preloading of an entire cargo, for example, from a ship or railroad train is the most efficient way to use the aforesaid system, it is important to utilize available loading space at a depot, and it is important, therefore, that storage platforms themselves when unloaded not take up more than minimal space. In accordance with one aspect of the present invention, a storage platform has been designed which may be nested and successively stacked upon other storage platforms in a manner to permit successive removal of individual platforms without difficulty. The design is such that fifteen to twenty large storage platforms may be stacked and nested, and the design is such that the nesting parts are freely removed from the nested position.

In accordance with another aspect of the present invention, the storage platform has been constructed to provide critical structural support to shipping containers so that the strength of the platform is maximized where required while the amount of steel needed to construct each platform is kept to a minimum.

In accordance with a further aspect of the invention, a liftable bed trailer of unique construction has been described.

These features will become apparent upon a further reading of the specification which follows:

SUMMARY OF THE INVENTION

The present invention in one of its aspects concerns a liftable bed truck trailer or transport vehicle having a fixed bed and a liftable bed, the liftable bed having means to cause the liftable bed to be moved upwardly from a loading position in which the liftable bed is superimposed thereupon to a raised transport position directly above the superimposed position, the foregoing comprising a plurality of generally equi-length rotary arms which are pivotally connected at each end thereof respectively to spaced apart portions of the fixed and liftable beds, the rotary arms being capable of swinging from a generally horizontal position in which the beds are superimposed to an overcenter position when the liftable bed is in its raised transport position, and means to stop movement of the liftable bed following movement of the rotary arms into the overcenter position. Various other features include the use of a goosenecked portion of the fixed bed to stop the aforesaid movement of the liftable bed or of a bifurcated stanchion and locking pin arrangement to retain the forward end of the liftable bed. In addition, reinforcing gusset means are provided intermediate the fixed and liftable beds in conjunction with the rotary arms to provide great strength vertically to support loads and stiffness transversely against wracking.

The present invention further concerns novel improvements with respect to mobile storage platforms having a horizontal frame or loading platform and supporting legs connected thereto wherein the improvement resides in the fact that the supporting legs are arranged in pairs, at least two pairs along each longitudinal side, the legs of each pair converging from their connector with the frame, a foot piece joined to the converging free ends of each pair, stop means attached to said converging ends and spacer means intermediate the upper ends of said legs and said frame, whereby a plurality of essentially identical mobile storage platforms may be stacked one upon the other with the converging pairs of legs of a next upper platform being received within the pairs of a next lower platform, said pairs nesting within each other and said stop means limiting nesting to prevent jamming in a longitudinal direction while said spacer means prevents jamming of said legs in a lateral direction.

BRIEF DESCRIPTION OF THE DRAWING

FIG. 1 is a plan view of a mobile storage platform constructed according to the present invention resting upon a liftable bed trailer;

FIG. 2 is a side elevation of the storage platform of FIG. 1 and of the liftable bed trailer;

FIG. 3 is a rear elevation of the storage platform of FIG. 1 and of the liftable bed trailer;

FIG. 4 illustrates the nesting and stackable nature of the mobile storage platforms of the present invention;

FIGS. 10 and 11 are top and side views respectively of another embodiment of the liftable bed trailer according to the present invention;

FIG. 12 is a view taken in the direction of arrows 12—12 of FIG. 11;

DESCRIPTION OF A PARTICULAR EMBODIMENT

Figure 5:
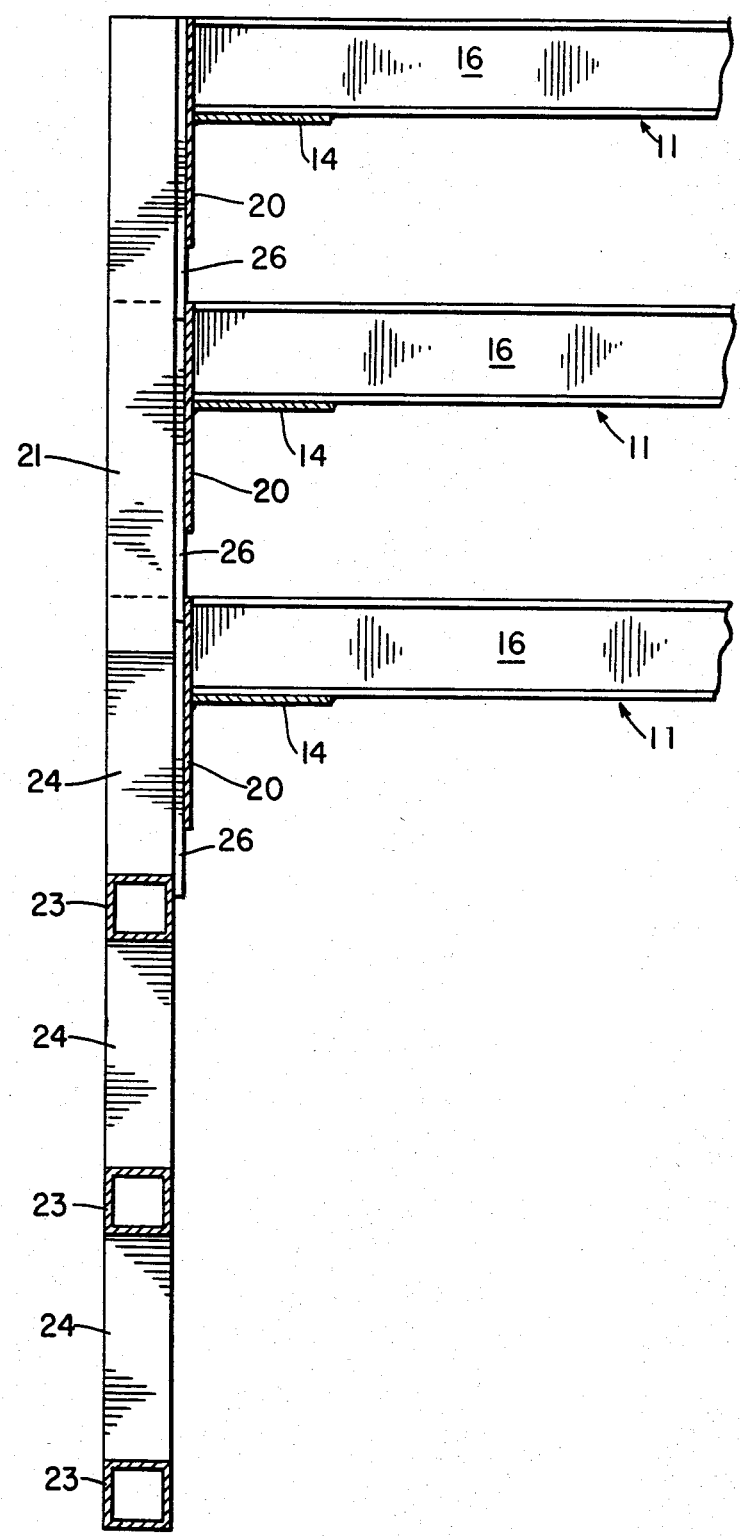
FIG. 5 is a vertical section taken in the direction of arrows 5—5 of FIG. 4.
Figure 6:
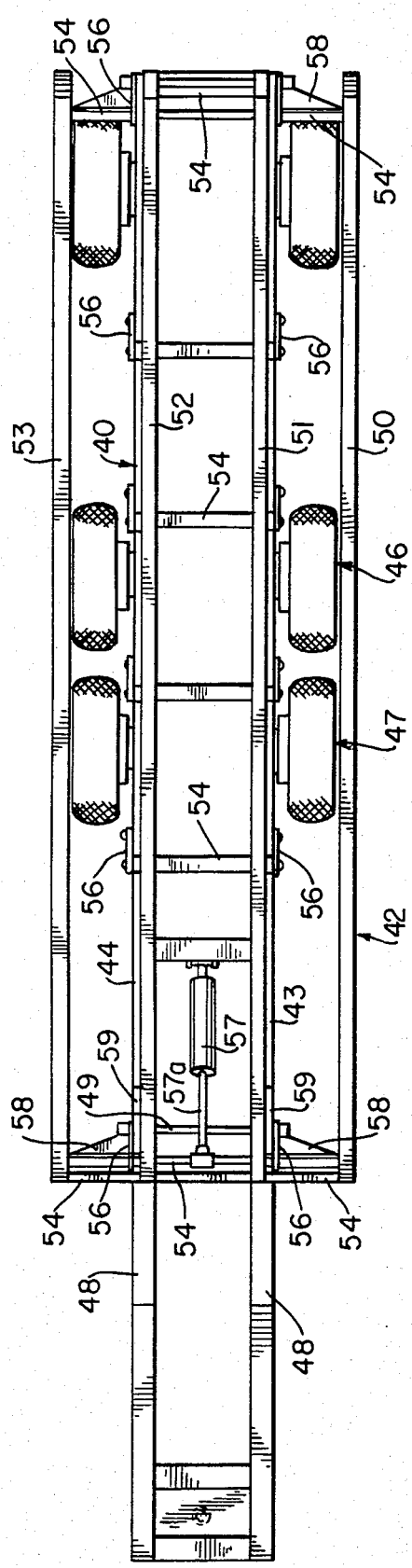
FIGS. 6 and 7 are respectively top and side views of an alternate liftable bed and trailer embodiment.
Figure 7:
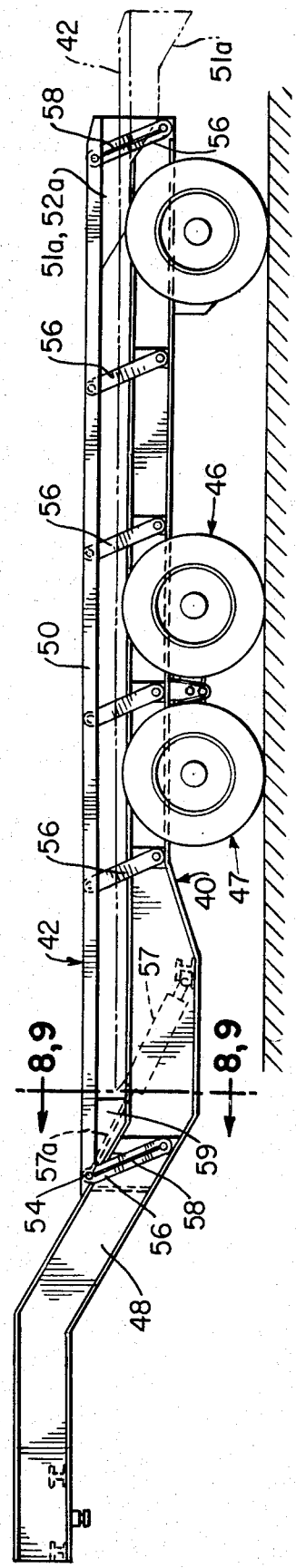
Figure 8:
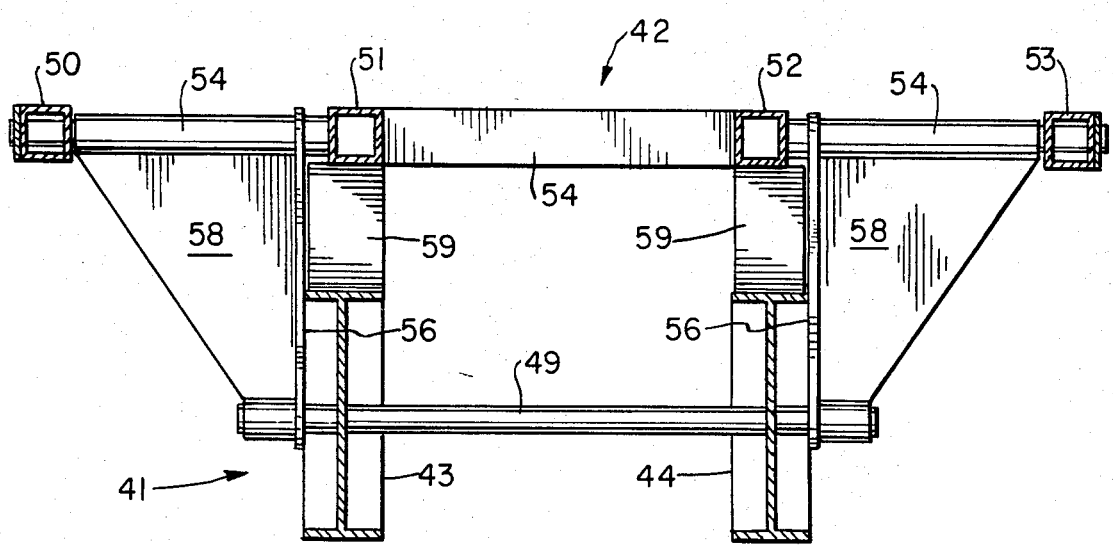
FIGS. 8 and 9 are views taken in the direction of arrows 8, 9 of FIG. 7 showing the liftable bed in its raised and lowered positions respectively.
Figure 9:
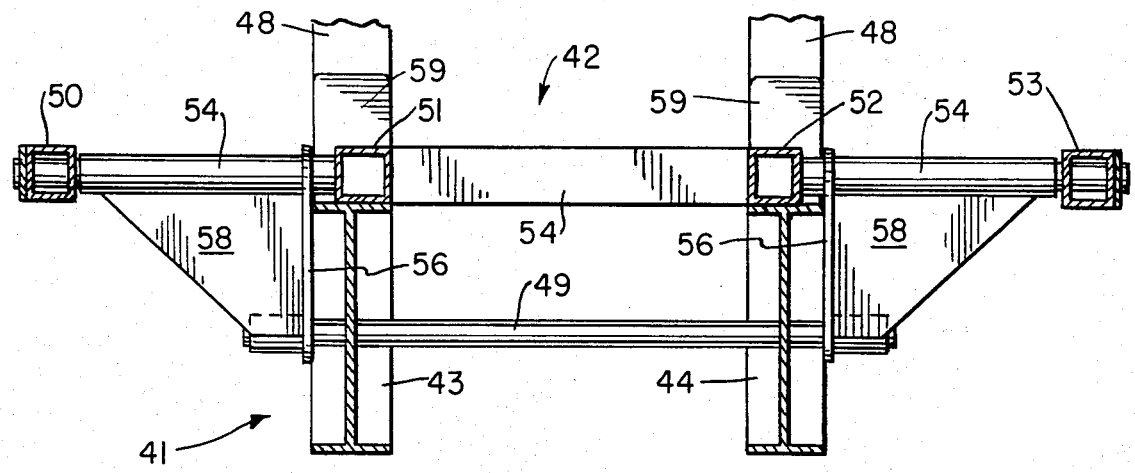

Referring now to the drawing and initially to FIGS. 1-3 hereof, a liftable bed trailer 40 has been illustrated in outline having superimposed thereupon a mobile storage platform 11 constructed in accordance with the principles of the present invention. The trailer 40 has a fixed bed 41 and a liftable bed 42. For the present purposes, it will suffice to state that hydraulic actuator means 57 have been provided to effect raising of the liftable bed 42 (supported and guided by rotary arms 56). As best seen in FIGS. 2 and 3, the legs of the storage platform 11 may be lifted clear of the roadway when the liftable bed 42 is in its raised position for transport.

Proceeding now more particularly to a description of the mobile storage platform which is the subject matter of the present invention, the platform 11 comprises peripheral, longitudinal members 14 and lateral members 16 which are welded together to form an open, horizontal platform. At each corner are structures 17 comprising enclosures of sheet steel in which are mounted locking elements 18. As is well known, such elements may engage within receptacles provided in cargo container 19 whose outline has been shown in FIGS. 2 and 3 resting upon the top of the mobile storage platform. A plate 20 is welded to each longitudinal member 14 to form a "T" therewith and to depend downwardly therefrom, and to enclose and abut the ends of the lateral members 16. Four pairs of legs 21 and 22 are welded to the structure just described, each pair being connected at the bottom by horizontal base members 23. Stop members 24 are welded along the lower portions of legs 21 and 22, and spacer members 26 are welded intermediate legs 21, 22 and plate 20 for a purpose which will be described.

The upper ends of legs 21 and 22 are attached to the horizontal frame section of the platform 11 at points ideally suited to support the load. Legs 22 are attached at the four corners, while legs 21 are attached adjacent to the ends of lateral members 16. Each pair of legs 21 and 22 downwardly converge toward each other to facilitate the vertical stacking of many platforms.

Referring now to FIGS. 4 and 5, the nesting and stacking feature of the present invention has been illustrated. It will be seen that because of the basic frustoconical shape of each pair of legs 21, 22, the respective pairs nest within each other like drinking cups. Stop members 24 prevent jamming of the pairs of legs 21, 22 in the longitudinal direction, while spacer plates 26 prevent lateral jamming between the stacked platforms. In this manner, it is quite possible to stack a dozen or more mobile platforms and to remove selected ones easily from the stack when needed.

We refer now more specifically to the liftable bed trailer of the present invention which will now be described in greater detail with respect to FIGS. 1-3. The bed 40 comprises a fixed bed 41 and adapted to be superimposed thereupon in the loading position, a liftable bed 42. The fixed bed 40 comprises longitudinal beams 43 and 44 which are supported by and connected to the wheel assemblies 46 and 47. At their forward ends, beams 43 and 44 angle upwardly forming a goosenecked section 48. Beyond the goosenecked section 48 (not shown), longitudinal members 43 and 44 become horizontal and are equipped with conventional means for attachment to the "fifth wheel" of a tractor trailer. The fixed bed includes a plurality of transverse beamlike members 49 (See FIG. 3) which are welded to and extend laterally between longitudinal members 43 and 44.

The liftable bed 42 includes four longitudinal box beams 50, 51, 52 and 53. These are interconnected by lateral or transverse members 54 to form a rigid horizontal platform which overlies the fixed bed 41. A plurality of rotary arms 56 are pivotally connected at their opposite ends respectively to the outsides of longitudinal beams 43 and 44 of the fixed bed and to longitudinal beams 51 and 52 of the liftable bed. At the forward end of the trailer, within a well formed in beams 43 and 44 of the fixed bed, is mounted a hydraulic actuator 57 whose actuator arm is connected to lateral beams 54 which comprise the forward end of the liftable bed 42, such connection being made immediately adjacent to arms 56 supporting the forward end of the liftable bed 42. Extension of the actuator shaft 57a into the position shown in FIG. 2 will cause rotation of arms 56 from a relatively horizontal position into the overcenter yet generally vertical position shown in the figures. This will cause lifting of the bed 42 from a superimposed position upon the fixed bed in which it is directly in contact therewith into the raised or transport mode position of FIG. 2. The bed 42 will thus be equipped to lift mobile storage platform legs 51, 52 from such superimposed position, and the arms 56 when viewed from the position of FIG. 2 will rotate counterclockwise with the liftable bed 42 thereto being lifted and brought forward against the goosenecked section 48. Goosenecked section 48 acts as a stop against further movement of the bed 42, and since the arms 56 are well overcenter, the bed 42 is secured against return movement to its lowered position. This is particularly so because the weight of the bed 42 and cargo thereupon will cause the bed to be brought to bear firmly against the goosenecked section 48.

It should be noted that when the beds 41 and 42 are superimposed in the loading position, the trailing edge of the liftable bed will extend to the rear of the trailing edge of the fixed bed a distance generally equal to the length of the arms 56 between their respective attachment points to the beds 41 and 42. However, because of the geometric configuration of the present apparatus, when the liftable bed 42 is in its fully raised and forward position (against the goosenecked section 48), this has the effect of shortening the overall length of the trailer 40 by the amount that the liftable bed has moved forward upon the goosenecked section 48. In other words, the overall length of the trailer necessary for a given length of cargo is shortened by some two feet by having the liftable bed moved up over and against a portion of the goosenecked section 48.

Referring now to FIGS. 6-9, a similar truck trailer embodying the described fixed bed/liftable bed concept has been illustrated. For purposes of clarification and simplicity of explanation, the reference numerals referring essentially to the same parts shown in FIGS. 1-3 have been retained. Again, for purposes of simplicity of explanation, only the essential differences between the respective configurations will be described.

Referring to FIGS. 6-9, it will be seen that rotary arms 56 are reinforced by gussets 58 that extend between the lateral members 49 and 54 respectively of the fixed and liftable beds. This greatly increases the support strength of the rotary arms for heavy loads. Additionally, at the forward end of the fixed bed and superimposed between the fixed bed and the liftable bed are support members 59 upon which the longitudinal beams 51 and 52 of the liftable bed rest when the liftable bed is in its fully raised and forward position. It has been found that this provides greater support strength for the forward end of the liftable bed and less strain on the goosenecked section 48. In the raised position, the trailing end of the liftable bed 42 mates against the trailing end 51 of the fixed bed via support elements 51a, 52a to provide the squared off configuration illustrated.

In the embodiment of FIGS. 10-12, the liftable bed is not rotated upwardly and forwardly against the goosenecked section but rather, the forward end of the liftable bed 42 is received within bifurcated yokes 63 which form the rearward extending portion of stanchions 64 rigidly attached to members 43 and 44 of the fixed bed 41. Plungers 66 adapted to be extended or retracted by fluid actuators 67 may be thrust through aligned apertures in yokes 63 and the received ends of beams 51 and 52 of the liftable bed. When in this position, the liftable bed will be securely restrained against forward or rearward movement. Actuator 65 causes lifting and lowering movement of the bed 42.

It will be noted that in the configuration of FIGS. 10-12, the outermost longitudinal members of the liftable bed of the members 50 and 53 of the liftable beds of the prior configurations have been omitted and that the reinforcing gussets 58 of the configurations of FIGS. 6-9 have also therefore been omitted. In order to provide support strength in the vertical direction and support strength against wracking in the transverse direction, in the embodiment, reinforcing gussets 69 are welded intermediate adjacent rotary arms 56 on the inside of beams 43, 44, 51 and 52. It will be further noted that an additional set of rotary arms 56 is mounted on the outside of the aforementioned beams 43, 44, 51 and 52. This arrangement gives great support strength to the liftable bed in its raised or transport mode position.

Figure 13:
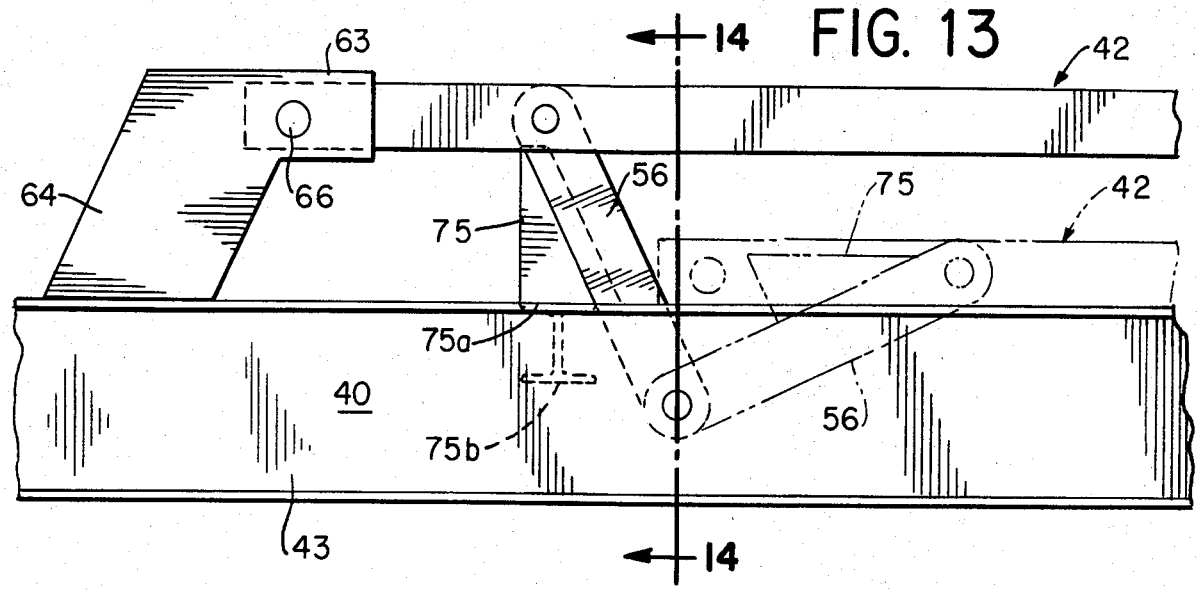
FIG. 13 is a variation of the liftable bed trailer configuration shown in FIG. 11.
Figure 14:
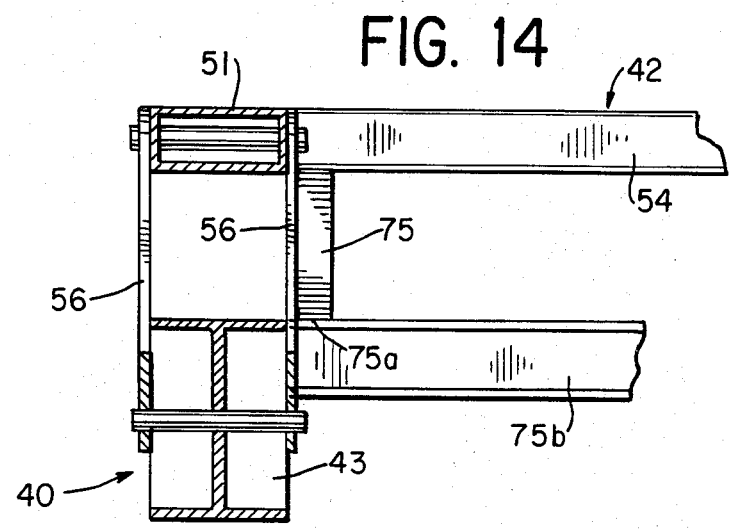
FIG. 14 is a view taken in the direction of arrows 14—14 of FIG. 12.

The embodiment of FIGS. 13 and 14 is similar to that of the previous embodiment; however, support members 75 are affixed to the inner arms 56 and their horizontal lower surfaces 75a rest on lateral beams 75b that extend between the fixed bed's longitudinal members 43 and 44 in order to assist in supporting the movable bed 42 throughout its entire length.

Figure 15:
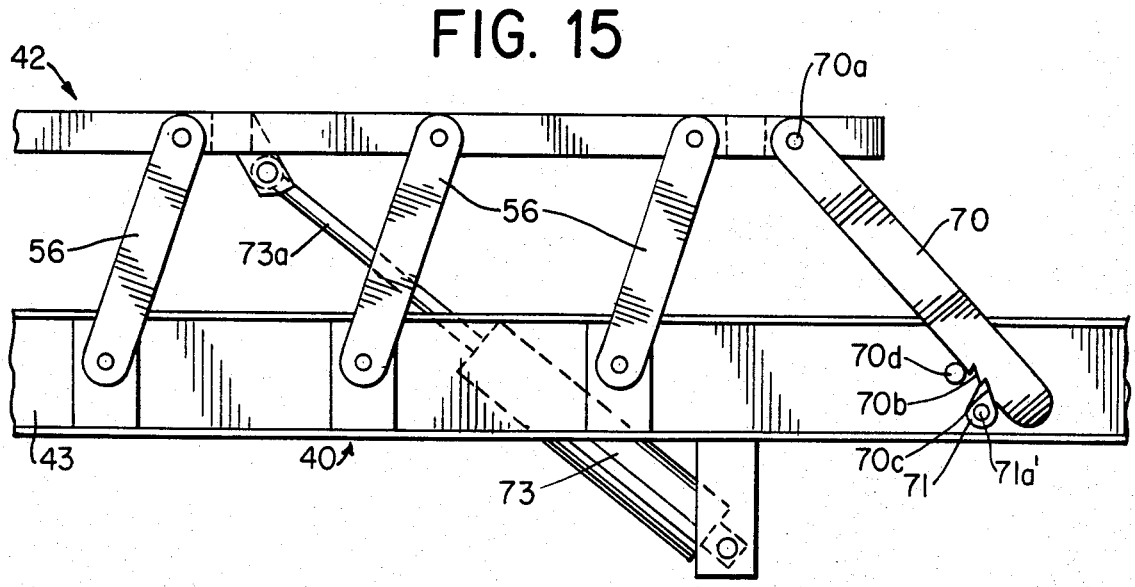
FIGS. 15 and 16 are views of an alternate embodiment of the invention respectively showing the liftable bed in its raised and lowered positions.
Figure 16:
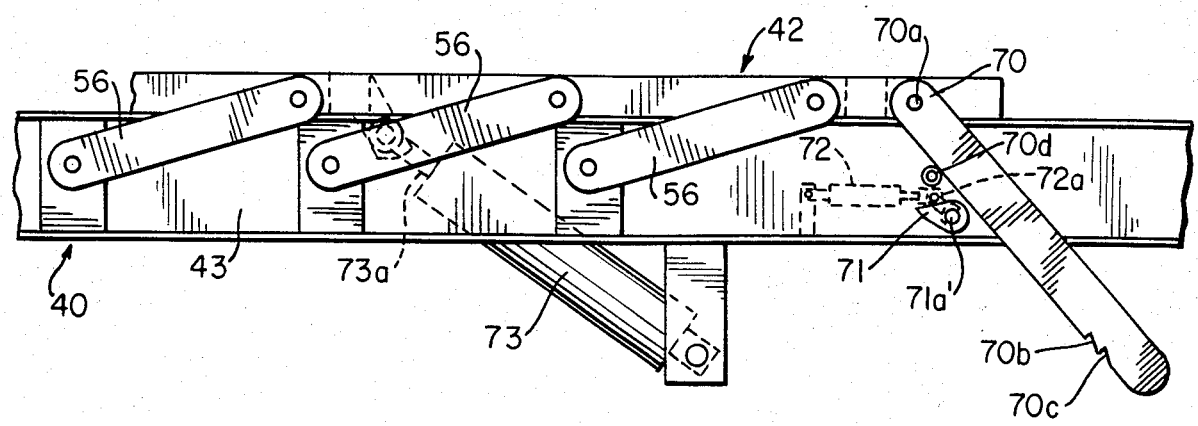

FIGS. 15 and 16 illustrate another alternative embodiment in maintaining the liftable bed 42 in its raised position. In this embodiment, a rachet arm 70 pivotally connected to 70a to the liftable bed 42 is aligned by pin 70d with a rachet 71 and is equipped at its lower end with notches 70b, 70c. Rachet 71 is rotatable on shaft 71a' by fluid cylinder 72 through a bell crank 72a from the position of FIG. 16 to the position of FIG. 15. In the latter, when the liftable bed 42 is fully raised, the end of rachet 71 will be inserted within one of the other of notches 70b, 70c to restrain reverse movement of the arms 56. When such reverse (lowering) movement is required, the rachet 71 will be rotated counterclockwise (as shown in FIG. 16) to remove the restraining force.

Lowering of the bed 42 to its position in FIG. 16 is then effectuated by action of hydraulic actuator 73.

It should be understood that the foregoing description has been of particular embodiments of the invention and is therefore merely representative. In order to understand the scope of the invention, reference should be made to the appended claims.

I claim:

1. In a transport vehicle having a fixed bed and a liftable bed, the fixed bed having means to cause said liftable bed to be moved upwardly from a loading position in which said liftable bed is superimposed thereupon to a raised transport position directly above said superimposed position, the improvement comprising: a plurality of generally equi-length rotary arms pivotally connected at each end thereof respectively to spaced apart portions of said fixed and liftable beds, said rotary arms being capable of swinging from a generally horizontal position in which said beds are superimposed to an overcenter position in which said liftable bed is in its raised transport position, stop means to stop movement of said liftable bed following movement of said rotary arms into said overcenter position, stanchion means connected to the fixed bed, said stanchion means extending generally upwardly and rearwardly, said stanchion means defining bifurcated means for the reception of the forward end of the liftable bed when the liftable bed is in its raised position and means interlocking the bifurcated means and the forward end of the liftable bed.

2. In a transport vehicle having a fixed bed and a liftable bed, the fixed bed having means to cause said liftable bed to be moved upwardly from a loading position in which said liftable bed is superimposed thereupon to a raised transport position directly above said superimposed position, the improvement comprising: a plurality of generally equi-length parallel rotary arms pivotally connected at each end thereof respectively to longitudinally spaced apart side portions of said fixed and liftable beds, said rotary arms being capable of swinging in unison in a first direction from a generally horizontal position in which said beds are superimposed to an overcenter position in which said liftable bed is in its raised transport position, stop means to stop movement of said liftable bed following movement of said rotary arms into said overcenter position, said stop means absorbing the forces imposed by and upon said liftable bed which are not absorbed and supported by said rotary arms, said stop means transmitting said forces to said fixed bed, means to effect rotation of said arms and said liftable bed in said first direction to bring said liftable bed into a raised position and means to effect counter-rotation of said arms to return said liftable bed to said superimposed position.

3. The transport vehicle according to claim 2 in which the vehicle is a truck trailer, the forward end thereof defines a goosenecked section and said liftable bed rotates upwardly toward said goosenecked section.

4. The transport vehicle according to claim 3 in which said goosenecked section comprises the means to stop movement of said liftable bed in the overcenter position.

5. The transport vehicle according to claim 2 which includes transverse means reinforcing said rotary arms to provide upward and sideward support to the liftable bed when in its raised position.

* * * * *